US012530540B2

(12) United States Patent
Nayar et al.

(10) Patent No.: US 12,530,540 B2
(45) Date of Patent: Jan. 20, 2026

(54) AUTOMATIC TOPIC MODEL ACCURACY EVALUATION UTILIZING LARGE LANGUAGE MODELING

(71) Applicant: Optum, Inc., Minnetonka, MN (US)

(72) Inventors: Nandini Nayar, New York, NY (US); Prakhar Mishra, Haryana (IN); Rony Krell, Brooklyn, NY (US)

(73) Assignee: Optum, Inc., Minnetonka, MN (US)

( * ) Notice: Subject to any disclaimer, the term of this patent is extended or adjusted under 35 U.S.C. 154(b) by 111 days.

(21) Appl. No.: 18/392,207

(22) Filed: Dec. 21, 2023

(65) Prior Publication Data
US 2025/0209280 A1    Jun. 26, 2025

(51) Int. Cl.
*G06F 40/40* (2020.01)

(52) U.S. Cl.
CPC .................... *G06F 40/40* (2020.01)

(58) Field of Classification Search
CPC ......... G06F 40/20; G06F 40/35; G06F 40/169
See application file for complete search history.

(56) References Cited

U.S. PATENT DOCUMENTS

| | | | | |
|---|---|---|---|---|
| 6,052,657 | A * | 4/2000 | Yamron | G06F 16/313 707/E17.084 |
| 9,165,254 | B2 * | 10/2015 | Duchon | G06Q 10/10 |
| 10,747,958 | B2 | 8/2020 | Nelson et al. | |
| 12,019,659 | B2 * | 6/2024 | Vasudevan | G06F 16/313 |
| 12,174,874 | B1 * | 12/2024 | Karp | G06F 16/313 |
| 2023/0196024 | A1 | 6/2023 | Buduguppa et al. | |
| 2023/0229861 | A1 | 7/2023 | Laban et al. | |
| 2023/0252287 | A1 | 8/2023 | Khetan et al. | |
| 2023/0267136 | A1 * | 8/2023 | Vasudevan | G06F 40/30 707/742 |
| 2024/0346251 | A1 * | 10/2024 | Le | H04L 51/02 |
| 2024/0346255 | A1 * | 10/2024 | Blohm | G06F 40/30 |
| 2025/0238686 | A1 * | 7/2025 | Ming | G06F 40/295 |

FOREIGN PATENT DOCUMENTS

CN    113901840 A    1/2022

OTHER PUBLICATIONS

Shenwai, Dhanshree, Evaluating Large Language Models: Meet AgentSims, A Task-Based AI Framework for Comprehensive and Objective Testing, MarkTechPost, Aug. 26, 2023, (2 pages), https://www.marktechpost.com/2023/08/26/evaluating-large-language-models-meet-agentsims-a-task-based-ai-framework-for-comprehensive-and-objective-testing/.
Stammbach, et al., "Re-visiting Automated Topic Model Evaluation with Large Language Models", Retrieved from https://arxiv.org/pdf/2305.12152.pdf, May 20, 2023, 10 pages.
Tripathi, Gyan Prakash, "How to Evaluate a Large Language Model (LLM)?", Analytics Vidhya, May 16, 2023, (7 pages), https://www.analyticsvidhya.com/blog/2023/05/how-to-evaluate-a-large-language-model-llm/.

(Continued)

*Primary Examiner* — Daniel Abebe
(74) *Attorney, Agent, or Firm* — ALSTON & BIRD LLP

(57) ABSTRACT

Embodiments address various deficiencies and provide technical advantages with respect to evaluating performance of topic models, particularly LLMs that perform topic modeling. Embodiments utilize a second LLM for evaluation, where the LLM is specially configured utilizing a particular evaluation rubric and domain-specific contextual data that enables accurate and automatic use of the configured LLM for topic model evaluation within particular domains.

20 Claims, 7 Drawing Sheets

(56) References Cited

OTHER PUBLICATIONS

Vu, et al., "Automatically Evaluating Question-Answering Models", Amazon Science, Jun. 16, 2021, (6 pages), https://www.amazon.science/blog/automatically-evaluating-question-answering-models.

Wang, et al., "Empower Large Language Model to Perform Better on Industrial Domain-Specific Question Answering", Retrieved from experarXiv: 2305.11541v2, May 30, 2023, (13 pages).

\* cited by examiner

| EVALUATION DATA VALUES 502 | METRICS 504 |
|---|---|
| 1 | TAG DATA MISSES MAIN POINT OF THE TEXT DATA |
| 2 | TAG DATA (I) CAPTURES A TANGENTIAL POINT OF THE TEXT DATA OR (II) MISUNDERSTANDS THE MAIN POINT OF THE TEXT DATA |
| 3 | TAG DATA CAPTURES THE MAIN POINT OF THE TEXT DATA BUT HAS NO ADDED DETAIL OR HAS AT LEAST ONE WRONG DETAIL |
| 4 | TAG DATA CAPTURES THE MAIN POINT OF THE TEXT DATA AT A DETAIL LEVEL THAT SHOULD BE MORE GRANULAR OR LESS GRANULAR |
| 5 | TAG DATA CAPTURES THE MAIN POINT OF THE TEXT DATA AT A TARGET LEVEL OF DETAIL |

FIG. 5

AUTOMATIC TOPIC MODEL ACCURACY EVALUATION UTILIZING LARGE LANGUAGE MODELING

TECHNICAL FIELD

Embodiments of the present disclosure generally relate to evaluation of machine learning model accuracy, and specifically to evaluation of accuracy of topic models utilizing a specially-configured large language model.

BACKGROUND

Model evaluation is particularly beneficial in ensuring processes that rely on a given model perform without error. Existing evaluation mechanisms applied to various models often are insufficient or inaccurate in certain contexts.

Applicant has discovered problems and/or inefficiencies with current implementations for model evaluation. Through applied effort, ingenuity, and innovation, Applicant has solved many of these identified problems by developing solutions embodied in the present disclosure, which are described in detail below.

BRIEF SUMMARY

In general, various embodiments of the present disclosure provide methods, apparatuses, systems, computing devices, computing entities, and/or the like for improved automatic evaluation of topic models.

In one aspect, a computer-implemented method includes identifying, by one or more processors, (i) text data and (ii) tag data corresponding to the text data, where the tag data includes data outputted from a topic model, providing, by the one or more processors, an evaluation rubric to a tag evaluation large language model (LLM), where the evaluation rubric defines a plurality of candidate evaluation results based on (i) a first metric representing whether a main point of the text data is captured by the tag data corresponding to the text data, and (ii) a second metric representing whether the tag data captures the main point of the text data at a target level of detail, providing, by the one or more processors, a domain-specific contextual data set to the tag evaluation LLM, providing, by the one or more processors, the text data and the tag data to the tag evaluation LLM, and receiving, by the one or more processors, evaluation data via the tag evaluation LLM, the evaluation data associated with the text data and the tag data.

The computer-implemented method may also include where the topic model is a topic-modeling LLM.

The computer-implemented method may also further includes initiating, by the one or more processors, at least one downstream process based on the evaluation data.

The computer-implemented method may also include where identifying the tag data includes providing, by the one or more processors, the text data to the topic model that generates the tag data.

The computer-implemented method may also include where identifying the tag data includes receiving, by the one or more processors, the tag data from a database, or receiving the tag data from an external device.

The computer-implemented method may also include where providing the text data and the tag data to the tag evaluation LLM includes generating, by the one or more processors, a first prompt identifying (i) the text data and (ii) the tag data, where the first prompt is provided to the tag evaluation LLM.

The computer-implemented method may also include where providing the evaluation rubric to the tag evaluation LLM includes generating, by the one or more processors, a second prompt defining the evaluation rubric, where the second prompt is provided to the tag evaluation LLM.

The computer-implemented method may also include where providing the domain-specific contextual data set to the tag evaluation LLM includes identifying, by the one or more processors, a set of meta-categories defining categorizations of texts associated with a particular domain, and providing, by the one or more processors, at least the set of meta-categories to the tag evaluation LLM.

The computer-implemented method may also include where providing the domain-specific contextual data set to the tag evaluation LLM includes identifying, by the one or more processors, a set of texts describing procedures performed in a particular domain, and providing, by the one or more processors, at least the set of texts to the tag evaluation LLM.

The computer-implemented method may also include where providing the domain-specific contextual data set to the evaluation LLM includes generating, by the one or more processors, a third prompt defining the domain-specific contextual data set, where the third prompt is provided to the tag evaluation LLM.

The computer-implemented method may also include where receiving the evaluation data via the tag evaluation LLM includes generating, by the one or more processors, a fourth prompt includes a request to generate the evaluation data based on one or more prompts previously provided to the tag evaluation LLM, where the fourth prompt is provided to the tag evaluation LLM.

The computer-implemented method may also include where the evaluation rubric includes a first grading level indicating that the tag data misses the main point of the text data, a second grading level indicating that the tag data captures a tangential point or that the main point of the text data is misunderstood, a third grading level indicating that the tag data captures the main point of the text data but has no added detail or has at least one wrong detail, a fourth grading level indicating that the tag data captures the main point of the text data at a detail level that should be more granular or less granular, or a fifth grading level indicating that the tag data captures the main point of the text data at the target level of detail.

The computer-implemented method may also include where initiating the at least one downstream process includes selecting, by the one or more processors, an optimal topic model from a plurality of topic models based on comparison of the evaluation data corresponding to the topic model with at least one other evaluation data corresponding to at least one other topic model of the plurality of topic models.

The computer-implemented method may also include further includes deploying, by the one or more processors, the optimal topic model to process subsequently-received text data.

The computer-implemented method may also include where initiating the at least one downstream process includes detecting, by the one or more processors and based on the evaluation data, that the topic model is associated with a decrease in accuracy, and outputting, by the one or more processors, an alert indicating that the topic model is associated with the decrease in accuracy.

The computer-implemented method may also include where initiating the at least one downstream process includes detecting, by the one or more processors, a change in the text data based on the evaluation data, and outputting an alert indicating the change in the text data.

The computer-implemented method may also include where the first prompt further identifies the evaluation rubric.

The computer-implemented method may also include where the first prompt further identifies the domain-specific contextual data set.

In accordance with another aspect of the disclosure, a system is provided that includes one or more processor and one or more memory having computer program code stored thereon that, in execution with the one or more processor, configures the system to perform any one of the example methods described herein.

In accordance with another aspect of the disclosure, a computer program product is provided that includes one or more non-transitory computer-readable storage medium having computer program code stored thereon that, in execution with at least one processor, configures the computer program product to perform any one of the example methods described herein.

Other technical features may be readily apparent to one skilled in the art from the following figures, descriptions, and claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 illustrates an example evaluation rubric in accordance with at least one embodiment of the present disclosure.

DETAILED DESCRIPTION

Figure 1:
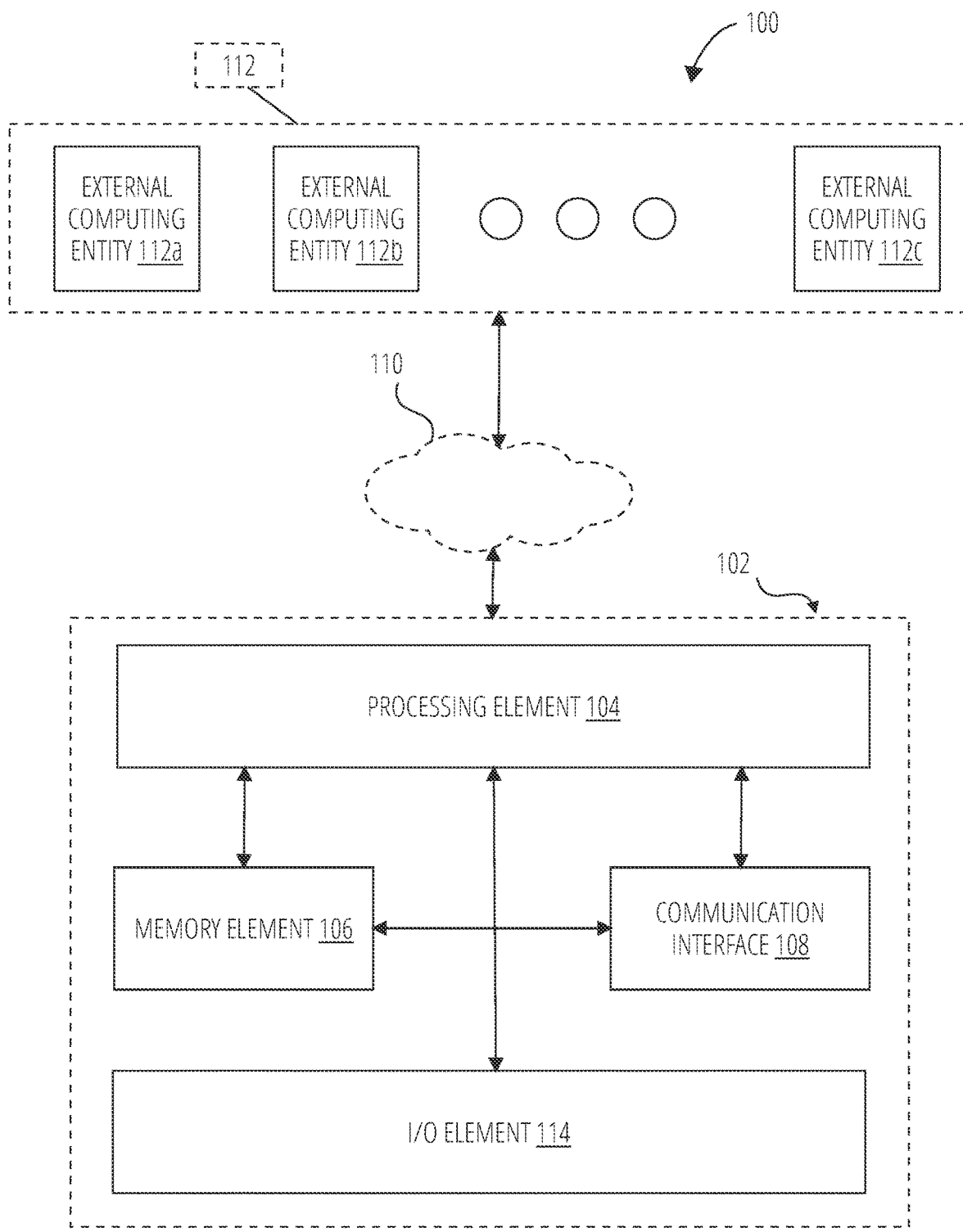
FIG. 1 illustrates an example computing system in accordance with at least one embodiment of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 illustrates an example computing system 100 in accordance with one or more embodiments of the present disclosure. The computing system 100 may include an evaluative computing entity 102 and/or one or more external computing entities 112a-c communicatively coupled to the evaluative computing entity 102 using one or more wired and/or wireless communication techniques. The evaluative computing entity 102 may be specially configured to perform one or more steps/operations of one or more evaluation techniques described herein. In some embodiments, the evaluative computing entity 102 may include and/or be in association with one or more mobile device(s), desktop computer(s), laptop(s), server(s), cloud computing platform(s), and/or the like. In some example embodiments, the evaluative computing entity 102 may be configured to receive and/or transmit one or more data objects from and/or to the external computing entities 112a-c to perform one or more steps/operations of one or more evaluation techniques described herein. Non-limiting examples of the evaluation techniques include the generation of evaluation data corresponding to a particular topic model based on tag data and/or text data as depicted and described further herein. Additionally or alternatively, in some embodiments, the techniques described herein improve efficiency and speed of training particular machine learning models (e.g., configuring accurate LLMs), thus reducing the number of computational operations needed and/or the amount of training data entries needed to train predictive machine learning models. Accordingly, the techniques described herein improve the computational efficiency, storage-wise efficiency, and/or speed of configuring accurate machine learning models.

The external computing entities 112a-c, for example, may include and/or be associated with one or more data centers and/or production environments. The data centers, for example, may be associated with one or more data repositories storing data that may, in some circumstances, be processed by the evaluative computing entity 102 to provide dashboard(s), machine learning analytic(s), evaluation process(es), and/or the like. Additionally or alternatively, in some embodiments, the external computing entity 112a-112c represent production environments. By way of example, the external computing entities 112a-c may be associated with a plurality of entities. A first example external computing entity 112a, for example, may host a registry for the entities. By way of example, in some example embodiments, the entities may include one or more service providers and the external computing entity 112a may host a registry (e.g., the national provider identifier registry, and/or the like) including one or more clinical profiles for the service providers. Additionally or alternatively, in some embodiments, the external computing entity 112a may include service provider data indicative of medical encounters serviced by the service provider, for example including patient data, CPT and/or diagnosis data, and/or the like. In addition, or alternatively, a second example external computing entity 112b may include one or more claim processing entities that may receive, store, and/or have access to a data set maintained by the entities, for example storing text data, tag data, and/or domain-specific contextual data portion(s). In this regard, the external computing entity 112b may include such patient data, CPT and/or diagnosis data, claims data, other code data, and/or the like for any of a number of medical encounters. In some embodiments, the external computing entity 112b embodies one or more computing system(s) that support operations of an insurance or other healthcare-related entity. In some embodiments, a third example external computing entity 112c may include a data processing entity that may preprocess the any such stored data generate one or more portions of data processable for evaluation. Additionally or alternatively, in some embodiments, the external computing entities includes an external computing entity embodying a central data warehouse associated with one or more other external computing entities, for example where the central data warehouse aggregates data across a myriad of other data sources. Additionally or alternatively, in some embodiments, the external computing entities includes an external computing entity embodying a user device or system that collect(s) user health and/or biometric data. Additionally or alternatively still, in some embodiments, one or more of the external computing entity 112a-112c embody a production environment that utilizes a topic model for any one or more of a myriad of processes and/or determinations, for example a computing device embodying a system that processes customer text and/or related submissions for categorizing and/or processing such text data.

The evaluative computing entity 102 may include, or be in communication with, one or more processing elements 104 (also referred to as processors, processing circuitry, digital circuitry, and/or similar terms used herein interchangeably) that communicate with other elements within the evaluative computing entity 102 via a bus, for example. As will be understood, the evaluative computing entity 102 may be embodied in a number of various ways. The evaluative computing entity 102 may be configured for a particular use or configured to execute instructions stored in volatile or non-volatile media or otherwise accessible to the processing element 104. As such, whether configured by hardware or computer program products, or by a combination thereof, the processing element 104 may be capable of performing steps or operations according to embodiments of the present disclosure when configured accordingly.

In one embodiment, the evaluative computing entity 102 may further include, or be in communication with, one or more memory elements 106. The memory element 106 may be used to store at least portions of the databases, database instances, database management systems, data, applications, programs, program modules, scripts, source code, object code, byte code, compiled code, interpreted code, machine code, executable instructions, and/or the like being executed by, for example, the processing element 104. Thus, the databases, database instances, database management systems, data, applications, programs, program modules, scripts, source code, object code, byte code, compiled code, interpreted code, machine code, executable instructions, and/or the like may be used to control certain aspects of the operation of the evaluative computing entity 102 with the assistance of the processing element 104. Additionally or alternatively, in some embodiments the memory element 106 supports a database of text data and/or corresponding tag data generated via one or more topic models.

As indicated, in one embodiment, the evaluative computing entity 102 may also include one or more communication interfaces 108 for communicating with various computing entities such as the external computing entities 112a-c, such as by communicating data, content, information, and/or similar terms used herein interchangeably that may be transmitted, received, operated on, processed, displayed, stored, and/or the like.

In some embodiments, any of the external computing entity 112a-112c may communicate with the evaluative computing entity 102 through one or more communication channels using one or more communication networks, for example the communications network 110. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The computing system 100 may include one or more input/output (I/O) element(s) 114 for communicating with one or more users. An I/O element 114, for example, may include one or more user interfaces for providing and/or receiving information from one or more users of the computing system 100. The I/O element 114 may include one or more tactile interfaces (e.g., keypads, touch screens, etc.), one or more audio interfaces (e.g., microphones, speakers, etc.), visual interfaces (e.g., display devices, etc.), and/or the like. The I/O element 114 may be configured to receive user input through one or more of the user interfaces from a user of the computing system 100 and provide data to a user through the user interfaces.

Figure 2:
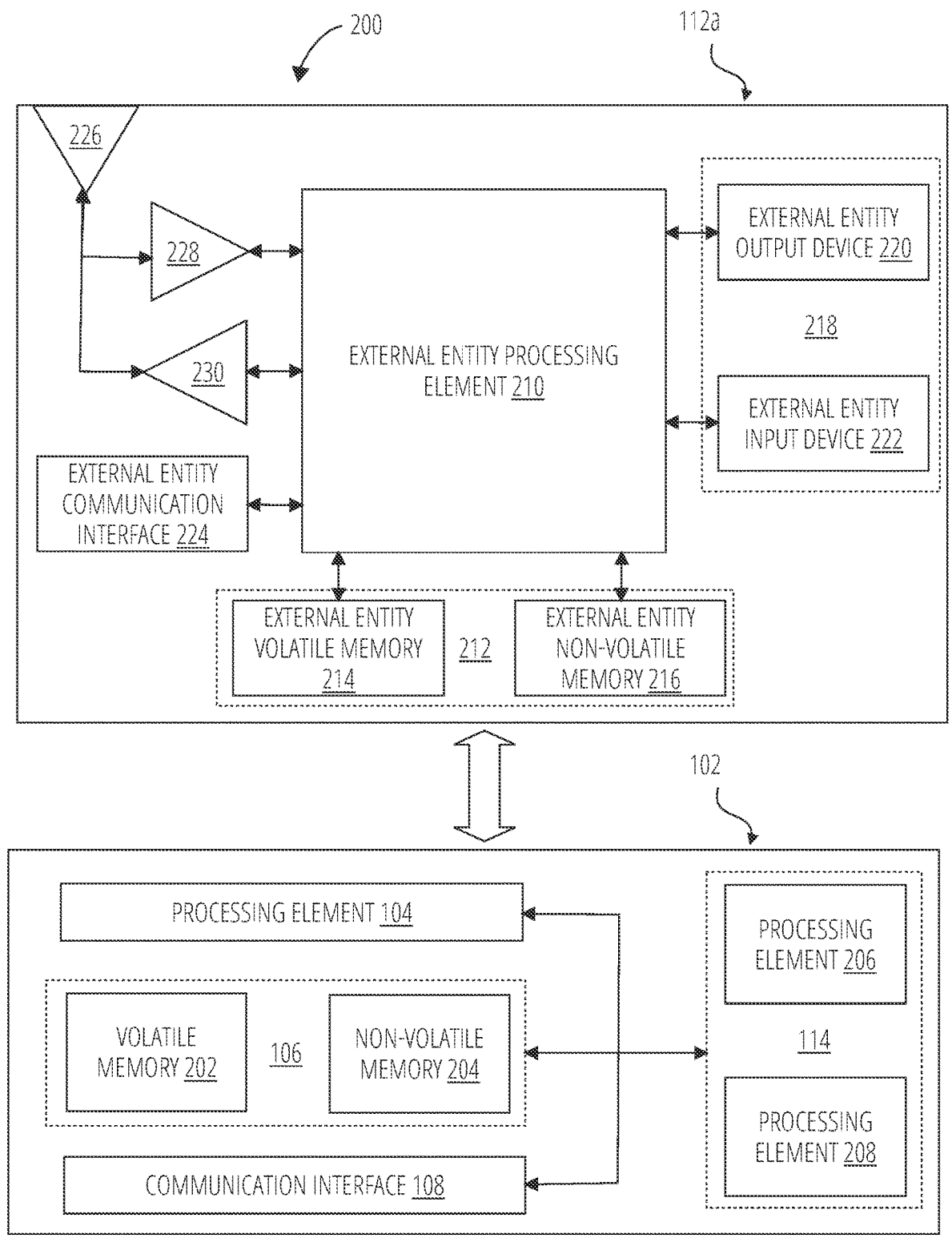
FIG. 2 is a schematic diagram showing a system computing architecture 200 in accordance with at least one embodiment of the present disclosure.

FIG. 2 is a schematic diagram showing a system computing architecture 200 in accordance with some embodiments discussed herein. In some embodiments, the system computing architecture 200 may include the evaluative computing entity 102 and/or the external computing entity 112a of the computing system 100. The evaluative computing entity 102 and/or the external computing entity 112a may include a computing apparatus, a computing device, and/or any form of computing entity configured to execute instructions stored on a computer-readable storage medium to perform certain steps or operations.

The evaluative computing entity 102 may include a processing element 104, a memory element 106, a communication interface 108, and/or one or more I/O elements 114 that communicate within the evaluative computing entity 102 via internal communication circuitry such as a communication bus, and/or the like.

The processing element 104 may be embodied as one or more complex programmable logic devices (CPLDs), microprocessors, multi-core processors, coprocessing entities, application-specific instruction-set processors (ASIPs), microcontrollers, and/or controllers. Further, the processing element 104 may be embodied as one or more other processing devices or circuitry including, for example, a processor, one or more processors, various processing devices and/or the like. The term circuitry may refer to an entirely hardware embodiment or a combination of hardware and computer program products. Thus, the processing element 104 may be embodied as integrated circuits, application specific integrated circuits (ASICs), field programmable gate arrays (FPGAs), programmable logic arrays (PLAs), hardware accelerators, digital circuitry, and/or the like.

The memory element 106 may include volatile memory 202 and/or non-volatile memory 204. The memory element 106, for example, may include volatile memory 202 (also referred to as volatile storage media, memory storage, memory circuitry and/or similar terms used herein interchangeably). In one embodiment, a volatile memory 202 may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The memory element 106 may include non-volatile memory 204 (also referred to as non-volatile storage, memory, memory storage, memory circuitry and/or similar terms used herein interchangeably). In one embodiment, the non-volatile memory 204 may include one or more non-volatile storage or memory media, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In one embodiment, a non-volatile memory 204 may include a floppy disk, flexible disk, hard disk, solid-state storage (SSS) (e.g., a solid-state drive (SSD)), solid state card (SSC), solid state module (SSM), enterprise flash drive, magnetic tape, or any other non-transitory magnetic medium, and/or the like. A non-volatile memory 204 may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile memory 204 may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

As will be recognized, the non-volatile memory 204 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

The memory element 106 may include a non-transitory computer-readable storage medium for implementing one or more aspects of the present disclosure including as a computer-implemented method configured to perform one or more steps/operations described herein. For example, the non-transitory computer-readable storage medium may include instructions that when executed by a computer (e.g., processing element 104), cause the computer to perform one or more steps/operations of the present disclosure. For instance, the memory element 106 may store instructions that, when executed by the processing element 104, configure the evaluative computing entity 102 to perform one or more step/operations described herein.

Implementations of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as in a particular directory, folder, or library. Software components may be static (e.g., pre-established, or fixed) or dynamic (e.g., created, or modified at the time of execution).

The evaluative computing entity 102 may be embodied by a computer program product include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media such as the volatile memory 202 and/or the non-volatile memory 204.

The evaluative computing entity 102 may include one or more I/O elements 114. The I/O elements 114 may include one or more output devices embodied at least in part by processing element 206 and/or one or more input devices embodied at least in part by processing element 208 for providing and/or receiving information with a user, respectively. The output devices may include one or more sensory output devices such as one or more tactile output devices (e.g., vibration devices such as direct current motors, and/or the like), one or more visual output devices (e.g., liquid crystal displays, and/or the like), one or more audio output devices (e.g., speakers, and/or the like), and/or the like. The input devices may include one or more sensory input devices such as one or more tactile input devices (e.g., touch sensitive displays, push buttons, and/or the like), one or more audio input devices (e.g., microphones, and/or the like), and/or the like.

In addition, or alternatively, the evaluative computing entity 102 may communicate, via a communication interface 108, with one or more external computing entities such as the external computing entity 112a. The communication interface 108 may be compatible with one or more wired and/or wireless communication protocols.

For example, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. In addition, or alternatively, the evaluative computing entity 102 may be configured to communicate via wireless external communication using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.9 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

The external computing entity 112a may include an external entity processing element 210, an external entity memory element 212, an external entity communication interface 224, and/or one or more external entity I/O elements 218 that communicate within the external computing entity 112a via internal communication circuitry such as a communication bus, and/or the like.

The external entity processing element 210 may include one or more processing devices, processors, and/or any other device, circuitry, and/or the like described with reference to the processing element 104. The external entity memory element 212 may include one or more memory devices, media, and/or the like described with reference to the memory element 106. The external entity memory element 212, for example, may include at least one external entity volatile memory 214 and/or external entity non-volatile memory 216. The external entity communication interface 224 may include one or more wired and/or wireless communication interfaces as described with reference to communication interface 108.

In some embodiments, the external entity communication interface 224 may be supported by one or more radio circuitry. For instance, the external computing entity 112a may include an antenna 226, a transmitter 228 (e.g., radio), and/or a receiver 230 (e.g., radio).

Signals provided to and received from the transmitter 228 and the receiver 230, correspondingly, may include signaling information/data in accordance with air interface standards of applicable wireless systems. In this regard, the external computing entity 112a may be capable of operating with one or more air interface standards, communication protocols, modulation types, and access types. More particularly, the external computing entity 112a may operate in accordance with any of a number of wireless communication standards and protocols, such as those described above with regard to the evaluative computing entity 102.

Via these communication standards and protocols, the external computing entity 112a may communicate with various other entities using means such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 112a may also download changes, add-ons, and updates, for instance, to its firmware, software (e.g., including executable instructions, applications, program modules), operating system, and/or the like.

According to one embodiment, the external computing entity 112a may include location determining embodiments, devices, modules, functionalities, and/or the like. For example, the external computing entity 112a may include outdoor positioning embodiments, such as a location module adapted to acquire, for example, latitude, longitude, altitude, geocode, course, direction, heading, speed, universal time (UTC), date, and/or various other information/data. In one embodiment, the location module may acquire data such as ephemeris data, by identifying the number of satellites in view and the relative positions of those satellites (e.g., using global positioning systems (GPS)). Alternatively, the location information/data may be determined by triangulating a position of the external computing entity 112a in connection with a variety of other systems, including cellular towers, Wi-Fi access points, and/or the like. Similarly, the external computing entity 112a may include indoor positioning embodiments, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning embodiments may be used in a variety of settings to determine the location of someone or something to within inches or centimeters.

The external entity I/O elements 218 may include one or more external entity output devices 220 and/or one or more external entity input devices 222 that may include one or more sensory devices described herein with reference to the I/O elements 114. In some embodiments, the external entity I/O element 218 may include a user interface (e.g., a display, speaker, and/or the like) and/or a user input interface (e.g., keypad, touch screen, microphone, and/or the like) that may be coupled to the external entity processing element 210.

For example, the user interface may be a user application, browser, and/or similar words used herein interchangeably executing on and/or accessible via the external computing entity 112a to interact with and/or cause the display, announcement, and/or the like of information/data to a user. The user input interface may include any of a number of input devices or interfaces allowing the external computing entity 112a to receive data including, as examples, a keypad (hard or soft), a touch display, voice/speech interfaces, motion interfaces, and/or any other input device. In embodiments including a keypad, the keypad may include (or cause display of) the conventional numeric (0-9) and related keys (#, *, and/or the like), and other keys used for operating the external computing entity 112a and may include a full set of alphabetic keys or set of keys that may be activated to provide a full set of alphanumeric keys. In addition to providing input, the user input interface may be used, for example, to activate or deactivate certain functions, such as screen savers, sleep modes, and/or the like.

III. EXAMPLE OF CERTAIN TERMS

"Candidate evaluation result" refers to a possible value for evaluation data as defined at least in part by an evaluation rubric. In one example context, an evaluation rubric defines a plurality of candidate evaluation results corresponding to different integers of a defined range, where lower integers represent less accurate tag data and higher integers represent more accurate tag data.

"Detail level" refers to a characterization of how detailed particular text data is with respect to a particular point. For example, a high detail level may represent that the text data is very detailed of a particular point and a low detail level may represent that the text data is abstract or otherwise not detailed with respect to the particular point.

"Domain" refers to a categorization of a defined scope of knowledge and/or information associated with text data.

"Domain-specific contextual data" refers to data that is providable as input to an LLM and that indicates definitions or other contextual use of particular text within a particular domain.

"Evaluation data" refers to electronically managed data that indicates an accuracy of tag data generated for a particular portion of text data based on a framework defined by an evaluation rubric.

"Evaluation rubric" refers to electronically managed data that defines different parameters and/or determinations utilized to assess accuracy of tag data with respect to corresponding text data. In some contexts, an evaluation rubric defines a range of candidate evaluation results that each represent a different level of accuracy of tag data with respect to a main point of corresponding text data and sufficiency of a detail level of the tag data with respect to the corresponding text data.

"LLM" refers to a large language model embodied by a deep learning model that is configured to provide general-purpose text processing and/or generating. A large language model is specially trained to receive input text in a human-comprehensible manner of a particular language and process such text data to generate output text in a human-comprehensible manner of a particular language.

"Main point" refers to a primary idea, concept, opinion, or other piece of information conveyed in a particular portion of text data.

"Meta-category" refers to abstract groupings of points that link a set of texts within a particular domain.

"Metric" refers to a parameter by which tag data corresponding to text data is evaluated to determine whether the tag data accurately represents the corresponding text data.

"Optimal topic model" refers to a topic model determined to most accurately generate tag data corresponding to inputted text data.

"Set" refers to one or more data structures configured to store any number of data values and/or data objects. A set in some contexts is unordered and in other contexts is ordered. A set may be configured to maintain a particular type or classification of data. A "[data object] set" refers to a set specifically of any number of that particular data object, for example a "domain-specific contextual data set" refers to a set including any number of portions of domain-specific contextual data.

"Tag data" refers to electronically managed data embodying an abstracted characterization of text data generated from machine-learning-based processing of the text data.

"Tag evaluation LLM" refers to an LLM specially-configured to generate evaluation data associated with a particular pair of text data and corresponding tag data.

"Tangential point" refers to a secondary point, concept, opinion, or other piece of information conveyed in a particular portion of text data that is different from a main point of the text data.

"Target level of detail" refers to a detail level determined to be appropriate to characterize a main point of text data.

"Text data" refers to any electronically-maintained text processable via one or more machine-learning models.

"Topic model" refers to a machine learning model specially configured to generate tag data for corresponding text data.

"Topic-modeling LLM" refers to an LLM specifically configured as a topic model.

"Validation data set" refers to a data set of text data and corresponding tag data that was evaluated via human annotation, where the data set embodies a ground truth utilized for comparison with results outputted via one or more machine learning models.

IV. OVERVIEW

In various contexts, topic modeling is particularly useful in any of a myriad of processes. For example, in the contexts of telehealth and home-based medical services, topic modeling plays an increasingly critical role in the future of providing accessible and affordable services. Often, in such contexts, various types of text data are processed in part of providing remote and/or automated services; for example incoming communications and/or related inquiries. Some contexts utilize topic modeling for monitoring and/or tracking issues, handling requests, and/or the like, such that ensuring accuracy of the topic models being utilized is particularly valuable to ensure such automated functions perform properly.

In some contexts, large language models (LLMs) have been utilized to perform topic modeling. Such LLMs generally function as black boxes and therefore are difficult to analyze to evaluate why a particular model generated particular output for a given set of inputs. While existing evaluation mechanisms for topic modeling, such as coherence-based analysis techniques and the like, are often utilized for different model types, these mechanisms do not sufficiently function for analysis of all topic model types, including in evaluation of LLMs for the task of topic modeling. For example, existing automated evaluation methods do not evaluate a group of tags well in the aggregate and particularly when existing LLM implementations are leveraged, such uses fail to sufficiently function within particular domains, such as within the healthcare domain. Additionally, coherence-based methodologies rely on large amounts of reference texts to be specially configured for a particular domain, for example at the time of training an evaluation model. Such inefficiencies and inaccuracies have left the industry to utilize manual evaluation in lieu of such automated tools, thus eliminating the possibility for fully autonomous system, introducing new vulnerabilities due to human-driven error, and significantly reducing efficiencies at which system can perform tasks due to the reliance on human actors.

Embodiments of the present disclosure utilize a custom-configured LLM (e.g., a tag evaluation LLM) to evaluate performance of any of a myriad of topic models, including other topic-modeling LLMs. LLMs historically have higher correlation with human scores in various language tasks, however as described, off-the-shelf implementations suffer from particular deficiencies with respect to evaluating topic models of a specific domain. Some embodiments leverage a specially configured evaluation rubric that defines particular values and/or ranges representing candidate evaluation results based on different values and/or determinations for one or more metrics. To improve accuracy and/or efficiencies with respect to a particular domain, some embodiments are configured based on particular input data, for example a domain-specific contextual data including any number of domain-specific contextual data portions. In this regard, the specific data is utilized to configure a tag evaluation LLM that accurately performs evaluation of performance for topic models, including other topic-modeling LLMs.

A domain-specific contextual data set may be identified utilizing one or more processes for processing. For example, a set of meta-categories may be generated, inputted, determined, retrieved, and/or otherwise defined for a particular domain. A historical dataset of contextual data may then be sampled, for example weighted by prevalence. The weights may be associated with different meta-categories such that particular categories that are more prevalent to a particular domain are higher weighted. The weights may be automatically determined, retrieved, inputted by a user, or otherwise defined. An evaluation rubric, which may be generalized or domain-specific, may then be built for processing topic models based on the domain-specific contextual data. Effectiveness of the evaluation rubric may then be validated and/or otherwise confirmed via expert scores by subject matter experts, and/or via aggregation and/or other combination of non-expert scores, corresponding to such an evaluation rubric.

Embodiments of the present disclosure provide a myriad of technical improvements and address a myriad of technical problems. The specially configured tag evaluation LLM is configured to accurately evaluate performance of one or more topic models based on the particular type and configuration of data inputs provided to the tag evaluation LLM. Additionally or alternatively, the specially configured tag evaluation LLM is configured to accurately perform for topic-modeling LLMs, thus expanding capabilities for automated evaluation where other evaluation mechanisms may fail entirely and/or perform inaccurately. The tag evaluation LLM advantageously performs without requiring complete re-training of an LLM upon which the tag evaluation LLM is based to make such an LLM function with accuracy for a specific domain. Additionally or alternatively, still, the specially configured evaluation rubric defines particular novel and advantageous metrics that are automatically determinable by the tag evaluation LLM to provide insight into emphasizing evaluation via the tag evaluation LLM based on particular relevant considerations. Additionally or alternatively, embodiments utilizing such tag evaluation LLMs enable fully automated performance evaluation with reliance on any human action and/or consideration.

Additionally or alternatively, some embodiments further provide technical advantages with respect to existing methodologies for topic model evaluation. Utilizing the tag evaluation LLM described herein, embodiments of the present disclosure provide greater accuracy than coherence-based evaluation. Additionally or alternatively, while coherence-based and/or existing evaluation methodologies may require processing of multiple portions of tag data and/or several iterations to learn properly evaluate a topic model, embodiments of the present disclosure use the tag evaluation LLM to accurately evaluate a topic model with less processed iterations of tag data, such as an accurate evaluation based solely on a single portion of tag data. Additionally or alternatively still, some embodiments utilize a tag evaluation LLM that is tag-type agnostic whereas other existing evaluation mechanisms may be unusable and/or inaccurate, such that tag data is accurately evaluated regardless of whether the tag data is abstractive or extractive in nature, for example.

Other technical improvements and advantages may be realized by one of ordinary skill in the art.

V. EXAMPLE SYSTEMS OPERATIONS

Figure 3:
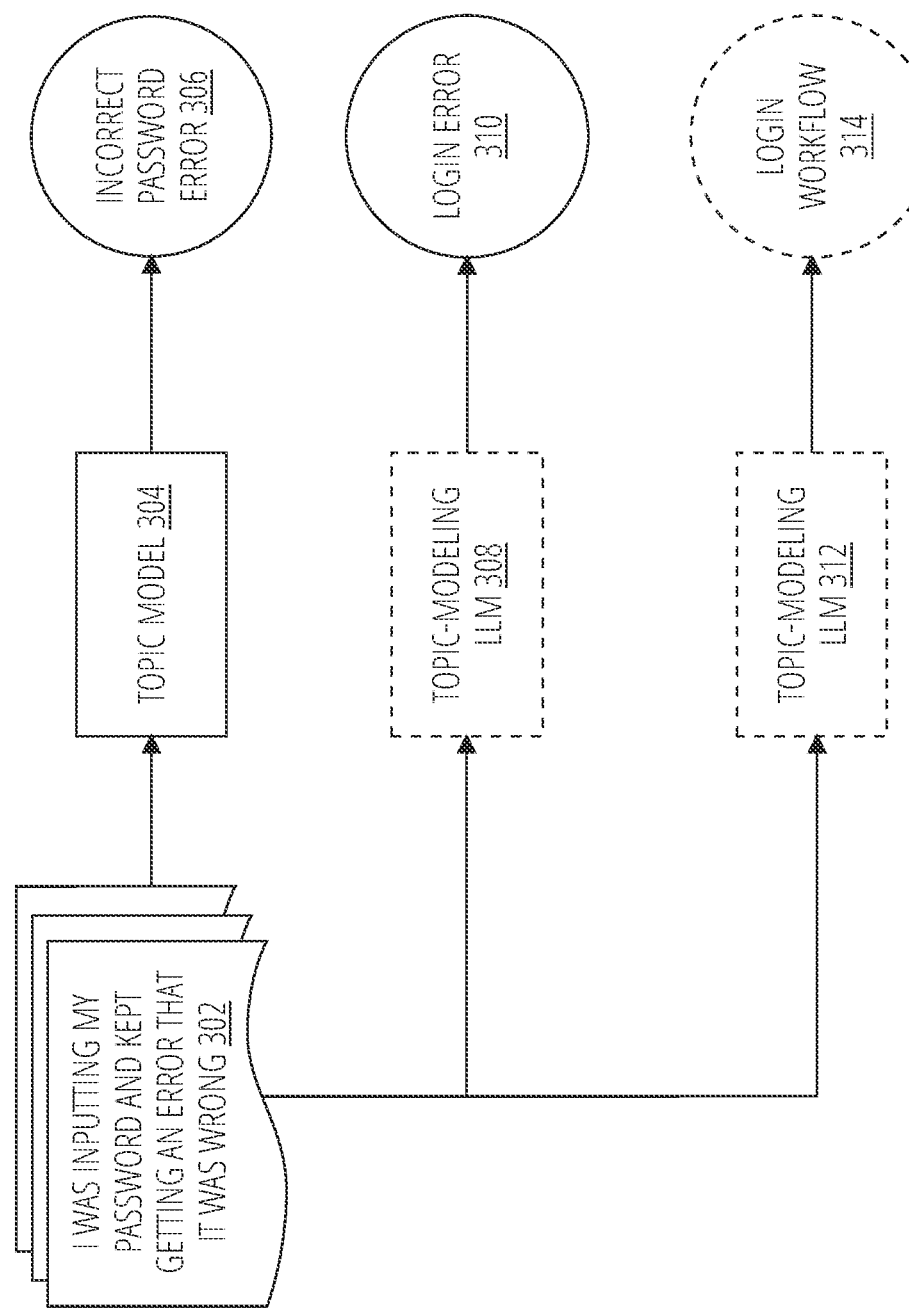
FIG. 3 illustrates an example visualization of topic modeling in accordance with at least one embodiment of the present disclosure.

FIG. 3 illustrates an example visualization of topic modeling in accordance with at least one embodiment of the present disclosure. Specifically, FIG. 3 depicts topic modeling performed for particular text data 302. In some embodiments, the text data 302 comprises any free text associated with a particular domain. In one example context, the text data 302 comprises telehealth-related free text, for example provider notes, claims text, virtual care call inquiries, customer service inquiries, customer feedback data, reviews data, and/or the like. The text data 302 may represent text in any format processable or otherwise interpretable by one or more computing devices. As depicted, in one example context the text data 302 embodies text of "I was inputting my password and kept getting an error that it was wrong." The text data 302 may be a user-submitted error inquiry associated with an error handling system.

In some embodiments, the text data 302 is submitted directly to the computing device that processes it. Additionally or alternatively, in some embodiments, the 302 is retrieved from a particular database storing any number of portions of text data. Additionally or alternatively still, in some embodiments, the text data 302 is received from an external computing device that communicates the text data for processing.

The text data 302 may be processable via any of a myriad of topic models to generate particular corresponding tag data. The tag data generated for the text data 302 in some embodiments represents an abstracted characterization of the text in the text data 302, for example where the corresponding tag data embodies a topic classification determined for the text of the text data 302. In some embodiments the text data 302 is processed by any number of machine learning models. The implementation of the machine learning model, training data, and/or training methodology for configuring a particular machine learning model may alter the resulting tag data generated by the model.

As illustrated, for example, the text data 302 is processed by topic model 304. In some embodiments, the topic model 304 comprises any machine learning mechanism configured to perform topic modeling for inputted text data. In some embodiments, the topic model 304 includes or is embodied by a latent semantic analysis model, probabilistic latent semantic analysis model, transformer model, bidirectional encoder representation from transformers model, and/or the like. Additionally or alternatively, in some embodiments, the topic model 304 includes an LLM specially configured for topic modeling, for example such that the topic model 304 embodies a first topic-modeling LLM. For example, in some embodiments, the topic model 304 embodies a GPT4 implementation and/or ChatGPT configured to receive and process the text data 302 inputted via one or more prompts to the model.

The topic model 304 generates the tag data 306. The tag data 306 embodies text representing the associated topic or other classification determined for the text data 302. In this regard, the tag data 306 corresponds to the text data 302, such that the classification or other abstraction represented in the tag data 306 is specific to the text data 302. As illustrated, for example, the tag data 306 embodies text of "incorrect password error." In this regard, the topic model 304 determined that the main point of the text data 302 is that the user is experiencing an incorrect password error. The topic model 304 may automatically determine both the main point of the tag data 306 and an associated detail level at which the main point is to be described by the text in the tag data 306.

It will be appreciated that the same text data may be processable utilizing any number of topic models. For example, in some embodiments, the text data 302 is optionally processed by one or more additional topic models, such as the topic-modeling LLM 308 and/or topic-modeling LLM 312. In some embodiments, the topic-modeling LLM 308 embodies a generic LLM implementation, such as a publicly available ChatGPT in stance. Additionally, in some embodiments, the topic-modeling LLM 312 embodies a GPT model instance specially configured via one or more prompts to perform topic modeling. It should be appreciated that the topic-modeling LLM 308 and/or topic-modeling LLM 312 may be embodied by any of a myriad of implemented machine learning model types.

The tag data 310 includes determined text representing a second classification or other abstraction of the text data 302 determined via the topic-modeling LLM 308. Specifically, the tag data 310 includes or is embodied by text of "login error." In this regard, the tag data 310 indicates that the main point of the text data 302 is that a login error has been encountered. Similarly, the tag data 314 includes determined text representing a third classification or other abstraction of the text data 302 determined via the topic-modeling LLM 312. Specifically, the tag data 314 includes or is embodied by text of "login workflow." In this regard, the tag data 310 indicates that the main point of the text data 302 is that the text is associated with a login workflow (e.g., the process a user utilizes to authenticate themselves and log into their account).

It should be appreciated that in this manner, different topic models may generate different tag data that may represent the same main point and/or different main points. Additionally or alternatively, different topic models may generate different tag data that represents the same main point and/or a different main point at varying detail levels. Such differences may be based on the configuration differences between the implementations of the topic model 304, topic-modeling LLM 308, and topic-modeling LLM 312. Such configuration differences may be one or more of an underlying model type, training data utilized, training mechanism utilized, hyperparameter values, and/or the like.

For example, as illustrated, the tag data 306 and the tag data 310 both capture a main point that the user is experiencing an error. The tag data 306 indicates the main point at a more specific detail level than the tag data 310, where the tag data 306 correctly indicates that the main point is that the error is an incorrect password error and the tag data 310 more generally indicates that the main point is that the error is a login error without further specificity. The tag data 314 captures an entirely different main point than both tag data 306 and tag data 310, specifically tag data 314 represents that the text is about a login workflow. In this regard, the tag data 314 may be considered to capture a tangential point rather than a main point of the text data 302. Though it may be more readily apparent to a human observer that the tag data 314 captures such a tangential point, a particular topic model may not be capable to accurately distinguish. Accordingly, the various topic models may be evaluated based on the tag data generated by each of such topic models via utilizing one or more of the mechanisms described herein as depicted and described with respect to any of FIGS. 4-7.

Figure 4:
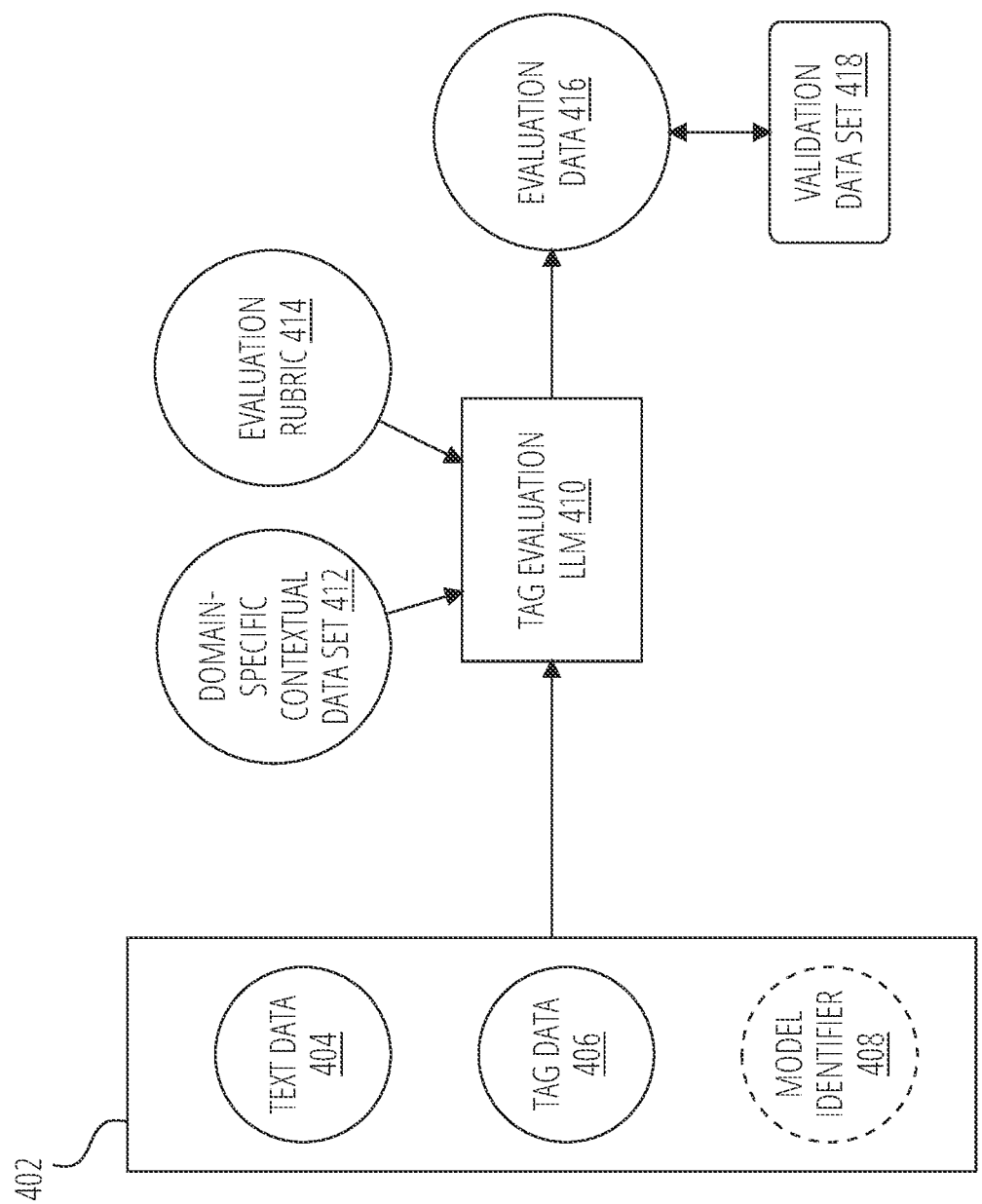
FIG. 4 illustrates an example data flow for generating evaluation data in accordance with at least one embodiment of the present disclosure.

FIG. 4 illustrates an example data flow for generating evaluation data in accordance with at least one embodiment of the present disclosure. Specifically, FIG. 4 depicts utilization of a tag evaluation LLM for generation of evaluation data for particular tag data corresponding to particular text data. In this regard, the data flow depicted may be utilized to generate evaluation data for each of any number of pairs of tag data and text data.

FIG. 4 includes a tag evaluation LLM 410 utilized to generate evaluation data 416. In some embodiments, the tag evaluation LLM 410 comprises any LLM implementation further configured based on one or more additional inputs. For example, in some embodiments, the tag evaluation LLM 410 comprises a ChatGPT or GPT4 implementation. The tag evaluation LLM 410 may be pre-trained for general use in any of a myriad of manners known in the art. In this regard, the tag evaluation LLM 410 may be specially configured to receive prompts that further configure the model to emphasize particular elements and/or gain a contextual understanding based on the data within said prompts.

In some embodiments, the tag evaluation LLM 410 is configured to receive at least a domain-specific contextual data set 412 as input for configuring the tag evaluation LLM 410. In some embodiments, the domain-specific contextual data set 412 includes any number of data portions that define or provide context within a particular domain associated with the topic modeling of tag data 406 for text data 404. In some embodiments, the domain-specific contextual data set 412 includes one or more texts associated with a particular domain. In this regard, the domain-specific contextual data set 412 may define a set of texts that utilizes terminology in manners consistent with the particular domain. For example, in some embodiments, the domain-specific contextual data set 412 includes texts describing procedures performed in a particular domain, such as where the particular domain embodies a telehealth and/or related medical domain. Additionally or alternatively, in some embodiments, the domain-specific contextual data set 412 includes texts defining and/or describing particular terminology as such terminology is utilized within the particular domain. Additionally or alternatively, in some embodiments, the domain-specific contextual data set 412 includes texts defined as a set of meta-categories of the particular domain. For example, in some embodiments, the meta-categories may define various abstracted classifications of text within the particular domain for consideration by the evaluation LLM. For example, in the particular context of medical texts and/or telehealth, non-limiting examples of meta-categories includes data representing categories of: scheduling, visit preparation and waiting, in-visit issues, post-visit issues, prescription issues, billing concerns, lab follow-up, provider software, and patient UI issues. In some embodiments, the domain-specific contextual data set 412 is retrieved from a database configured to store any number of domain-specific contextual data portions, and/or received directly from one or more external computing devices.

In some embodiments, the meta-categories are received via user input. In this regard, the meta-categories may be defined by subject matter experts of other users that interact with the system, for example by generating one or more prompts for consideration. Additionally or alternatively, some embodiments automatically generate the meta-categories associated with one or more portions of domain-specific context data. For example, some embodiments perform text processing to generate the meta-categories from keywords or other extracted text from at least a portion of domain-specific context data. The meta-categories in some embodiments are provided to the evaluation LLM together with and/or additional to the domain-specific context data set itself. A non-limiting example of a prompt utilized to input the meta-categories specific to an example domain of healthcare is as follows:

"Refer to the following information to understand how the healthcare company works. These can help understand how well the main point of the issue aligns with the topic. Topics that combine categories or use generic words not specific to any process should be penalized.

Categories:
Scheduling—The patient/member schedules or books an appointment to visit the doctor online. They then receive a link to join the virtual visit.
Visit Connection—The patient/member connects to the virtual appointment or visit and communicates through audio and video with the provider.
Chart—The patient's appropriate imaging, documents, notes, medical lab results, reports etc. are recorded and accessed from the patient's medical chart by the provider and patient.
Prescription—This is the process of successfully requesting, ordering, and/or receiving a medication, a doctor issued prescription, or prescription from a pharmacy.
Billing or Payment—This involves understanding charges and being able to successfully make payments for visits.
Provider Software—These are issues faced by the provider, doctor and/or medical staff in accessing patient information or in using their technical interface.
Patient UI—These involve the user's ability to successfully use the online interface to get desired information or perform actions. This includes successfully using browsers, websites, apps, accessing information, placing requests, orders, and/or the like."

It should be appreciated that one or more prompts may be inputted to the tag evaluation LLM 410 to provide any of the data indicated herein. In some embodiments, a single prompt is provided including all portions of such data. In other embodiments, a prompt may include multiple portions of data, but not all data. Alternatively in some embodiments, each portion of data may be provided in a distinct prompt. The data to be provided in one or more prompts may include, without limitation, a domain-specific contextual data set and/or portions thereof (e.g., meta-categories, domain-specific texts, and/or the like), evaluation rubric, text data, tag data, and/or the like.

Additionally or alternatively, in some embodiments, the tag evaluation LLM 410 is configured to receive an evaluation rubric 414. The evaluation rubric 414 defines different metrics utilized to assess accuracy of tag data with respect to the corresponding text data. In some embodiments, the evaluation rubric 414 defines any number of different candidate evaluation results, where each different candidate evaluation result corresponds to a different combination of values for such particular metrics of assessing accuracy. In some embodiments, the evaluation rubric 414 defines such candidate evaluation results based on a first metric assessing an accuracy of whether a main point of the text data corresponding to the tag data is captured or not captured. The evaluation rubric 414 further defines such candidate evaluation results based on a second metric assessing whether the tag data captures any such point at a target level of detail. In this regard, a different detail level may be appropriate in tag data based on the specificity of text data corresponding to the tag data. A non-limiting example of an evaluation rubric 414 is depicted and described herein with respect to FIG. 5.

Additionally or alternatively, in some embodiments, the tag evaluation LLM 410 is configured to receive topic model-related inputs 402. The topic model-related inputs 402 may include any number of data values associated with a topic model being evaluated based on generated tag data for particular text data. For example, as illustrated, the topic model-related inputs 402 in some embodiments includes text data 404, tag data 406, and model identifier 408. In some embodiments, the text data 404 represents the text data processed by a particular topic model to generate the tag data 406. The tag data 406 represents the generated abstraction, classification, or other information characterizing a determined point of the text data 404. Additionally or alternatively, in some embodiments the topic model-related inputs 402 includes a model identifier 408 that uniquely identifies the model that generated the tag data 406 for the text data 404. In this regard, the model identifier 408 may be utilized to identify which model is being evaluated and/or assign generated evaluation data to that model specifically. In some embodiments, one or more of the topic model-related inputs 402 is received from one or more of the computing devices supporting the topic model corresponding to the model identifier 408. Alternatively or additionally, in some embodiments one or more of the topic model-related inputs 402 is retrieved from a database accessible to the computing device supporting the tag evaluation LLM 410.

In some embodiments, the tag evaluation LLM 410 receives one or more inputs via at least one prompt provided to the model. In some embodiments, a different prompt is provided to the tag evaluation LLM 410 for each input type. For example, in some embodiments a first prompt associated with the evaluation rubric 414 is provided to the tag evaluation LLM 410 to input the evaluation rubric 414 to the tag evaluation LLM 410, a second prompt associated with the domain-specific contextual data set 412 is provided to the tag evaluation LLM 410 to input the domain-specific contextual data set 412 to the tag evaluation LLM 410, and a third prompt is provided to the tag evaluation LLM 410 to input the topic model-related inputs 402 to the tag evaluation LLM 410. Additionally or alternatively, a different prompt may be utilized to provide each of the text data 404, tag data 406, and/or model identifier 408 to the tag evaluation LLM 410. In some embodiments, a single prompt is generated and provided to the tag evaluation LLM 410 that combines one or more of the inputs, such as portions of the topic model-related inputs 402, domain-specific contextual data set 412, and/or evaluation rubric 414 together.

The tag evaluation LLM 410 generates the evaluation data 416. In some embodiments, the evaluation data 416 embodies a particular selected candidate evaluation result from the plurality of candidate evaluation results defined by the evaluation rubric 414. The tag evaluation LLM 410 may select the particular candidate evaluation result to represent the evaluation data 416 based on the pre-trained learnings of the tag evaluation LLM 410 as well as any learnings derived based on the topic model-related inputs 402, the domain-specific contextual data set 412, and the evaluation rubric 414. In one example context, the evaluation data 416 represents whether a determination of whether the tag data 406 captures a main point of the text data 404 and whether the tag data 406 captures the main point at a target level of detail. The target level of detail may represent a detail level that the tag evaluation LLM 410 determines is appropriate based on the text data 404.

In some embodiments, the tag evaluation LLM 410 is utilized to process a plurality of tag data portions for a plurality of corresponding text data portions. In this regard, a plurality of portions of evaluation data may be generated corresponding to a particular topic model. Some embodiments process the plurality of portions of evaluation data to generate a final evaluation data for the topic model. For example, in some embodiments, the plurality of evaluation data portions is simple averaged, weighted averaged, topic-wise averaged, and/or otherwise combined to generate a final evaluation data that is assigned to the topic model.

Some embodiments process the evaluation data 416 for validation during training and/or configuration of the tag evaluation LLM 410. For example, some embodiments may compare the evaluation data 416 with one or more portions of validated data in a validation data set 418. In this regard, in some embodiments the text data 404 and tag data 406 corresponds to a particular validated data portion in the validation data set 418, where the validated data portion embodies a trusted and/or human-annotated selected candidate evaluation result from the evaluation rubric 414. Such embodiments may compare the portion of the validation data set 418 with the evaluation data 416 to determine whether the evaluation data 416 matches or otherwise is similar to the corresponding portion of validated data in the validation data set 418 and update the training of the tag evaluation LLM 410 based on such a determination. In embodiments where training is completed and/or the tag evaluation LLM 410 is utilized in production, the validation data set 418 is not considered and the evaluation data 416 is stored and/or processed independently.

FIG. 5 illustrates an example evaluation rubric in accordance with at least one embodiment of the present disclosure. Specifically, FIG. 5 depicts a particular evaluation rubric 500. In some embodiments, the evaluation rubric 500 embodies a particular instance of the evaluation rubric 414.

As illustrated, the evaluation rubric 500 defines a plurality of candidate evaluation results. The candidate evaluation results define different evaluation data values 502, where evaluation data value embodies a different candidate evaluation result. For example, as depicted, the evaluation data values 502 includes a candidate evaluation result 502a, candidate evaluation result 502b, candidate evaluation result 502c, candidate evaluation result 502d, and candidate evaluation result 502e. Each candidate evaluation result corresponds to a particular integer value in a bounded range from 1-5. For example, in some embodiments, the candidate evaluation result 502a corresponds to a value of 1, the candidate evaluation result 502b corresponds to a value of 2, and so on. Such values in some embodiments correspond to a score representing an accuracy of corresponding tag data, where higher values generally correspond to a higher score representing a more accurate characterization of the text data by the corresponding tag data.

The evaluation rubric 500 defines the different evaluation data values 502 representing the candidate evaluation results based on corresponding metrics. As illustrated, the evaluation rubric 500 defines the evaluation data values 502 based on the metrics 504. The metrics 504 define what parameters a tag evaluation LLM is configured to consider in generating the corresponding evaluation result from the evaluation data values 502. For example, in some embodiments, the metrics 504 are configured to define different combinations of two metrics: (i) a first metric of whether tag data for corresponding text data captures the main point of the text data, and (ii) a second metric of whether tag data for corresponding text data captures the main point at a target level of detail. In some embodiments, the first metric corresponding to the evaluation rubric 500 may be assigned a stronger value in circumstances where the main point of the text data is captured by the corresponding tag data, and/or may be assigned a weaker value in a circumstance where the tag data captures a tangential point of the text data or completely misses any point of the text data. In some embodiments, the second metric corresponding to the evaluation rubric 500 may be assigned a stronger value in a circumstance where the tag data describes the captured point, or the main point, at a particular level of detail determined by the tag evaluation LLM as sufficiently detailed. In this regard, the second metric corresponding to the evaluation rubric 500 may be assigned a stronger value in a circumstance where the tag data describes the captured point with helpful detail that corresponds to an appropriate categorical level, and/or may be assigned a weaker value in a circumstance where the tag data describes the captured point with too much detail or too little detail (e.g., too abstractly).

It should be appreciated that the evaluation rubric 500 may be altered in one or more other embodiments. In some embodiments, the evaluation data values 502 defines a wider and/or more granular range. For example, in some embodiments, the evaluation data values 502 defines a range from 1 to 20, with different levels defined from 1-4, 5-8, 9-12, 13-16, and 17-20. In this regard, the evaluation data generated by the topic-modeling LLM in some embodiments defines both the particular value as a score for the tag data and/or defines the score level for the sub-range that the score value falls within.

Figure 6:
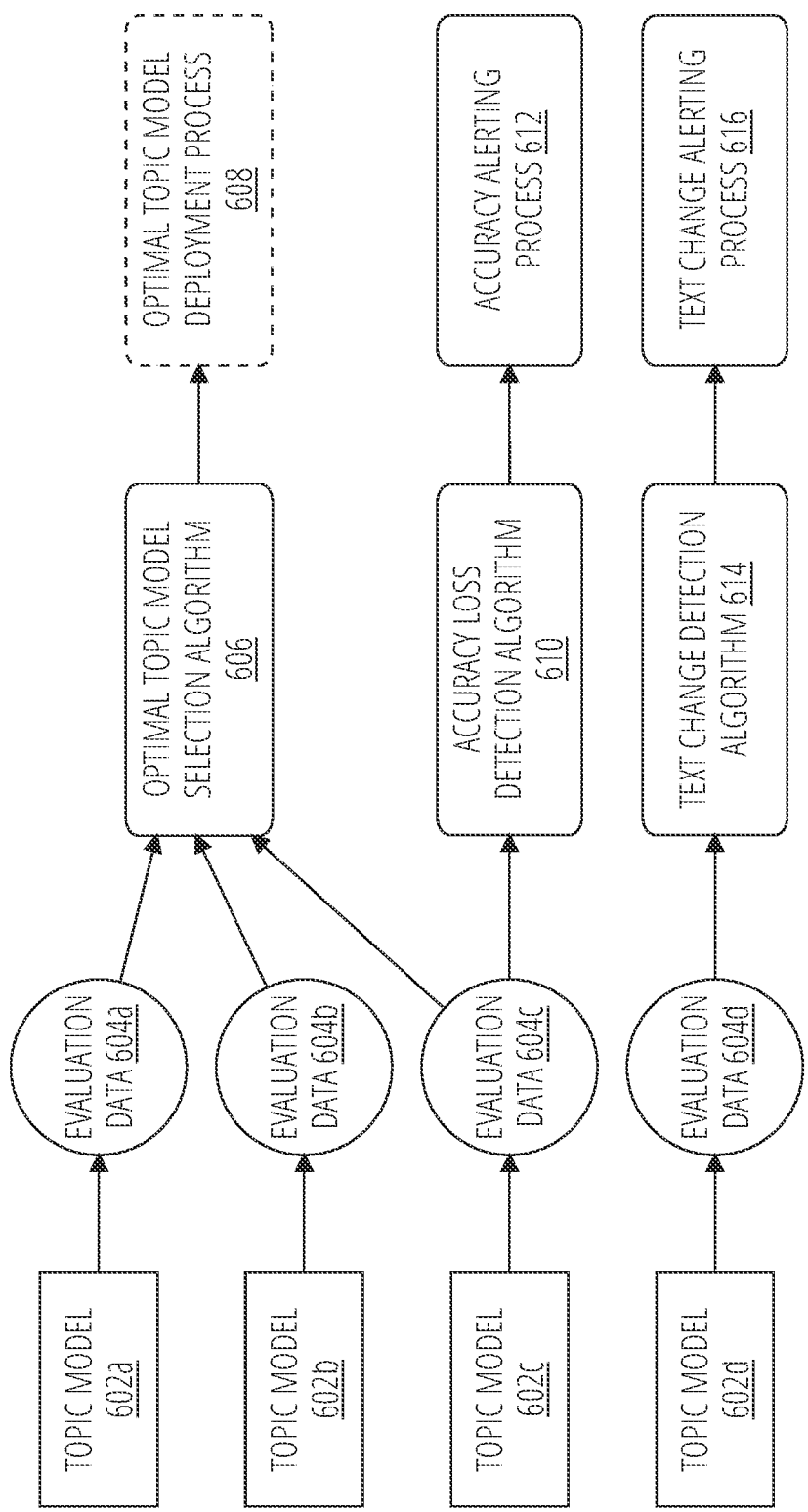
FIG. 6 illustrates an example data flow for processing evaluation data in accordance with at least one embodiment of the present disclosure.

FIG. 6 illustrates an example data flow for processing evaluation data in accordance with at least one embodiment of the present disclosure. Specifically, FIG. 6 depicts a data flow for initiating downstream processes based on generated evaluation data for one or more topic models. Some embodiments may be configured to perform one or more of the downstream processes, and/or may transmit evaluation data to one or more external device that performs the downstream process.

In some embodiments, a plurality of evaluation data is processed to select an optimal topic model from a plurality of different topic models. For example, as illustrated and in some embodiments, evaluation data is generated for each of the topic model 602a, topic model 602a, and topic model 602c, specifically the evaluation data 604a, evaluation data 604b, and evaluation data 604c respectively. It should be appreciated that, in some embodiments, each portion of evaluation data is generated as depicted and described with respect to FIG. 4 and FIG. 5.

Some embodiments process the plurality of evaluation data portions, for example the evaluation data 604a, evaluation data 604b, and evaluation data 604c, utilizing an optimal topic model selection algorithm 606. The optimal topic model selection algorithm 606 compares the various portions of evaluation data to determine an optimal topic model from the plurality of topic models associated with the plurality of portions of evaluation data. For example, some embodiments compare the evaluation data 604a, evaluation data 604b, and evaluation data 604c to determine the topic model corresponding to the evaluation data that indicates the most accurate topic model. In some contexts, the optimal topic model is the topic model that corresponds to the portion of evaluation data that represents the highest value between each portion of the evaluation data of the evaluation data 604a, evaluation data 604b, and evaluation data 604c. In this regard, the optimal topic model selection algorithm 606 in some embodiments selects the evaluation data having the highest score value between the evaluation data 604a, evaluation data 604b, and evaluation data 604c, and selects the topic model of the topic model 602a, topic model 602b, and topic model 602c corresponding to the evaluation data having the highest score value as the optimal topic model.

The optimal topic model selected from the plurality of topic models may be utilized for any of a myriad of purposes. Some embodiments execute or otherwise cause execution of an optimal topic model deployment process 608. In some embodiments, the optimal topic model deployment process 608 deploys the optimal topic model selected into a production environment for use in performing topic modeling. For example, in some embodiments, the optimal topic model deployment process 608 sets the optimal topic model for use in subsequent text processing for topic modeling, for example for categorizing subsequently-inputted text data with tag data generated via the optimal topic model. Additionally or alternatively, in some embodiments, an indication of the optimal topic model is outputted to a display.

Additionally or alternatively, some embodiments process one or more portions of evaluation data to determine whether a topic model has decreased in accuracy. As illustrated, the evaluation data 604c corresponding to the topic model 602c is processed via an accuracy loss detection algorithm 610. In some embodiments, the accuracy loss detection algorithm 610 compares the evaluation data with one or more other portions of evaluation data associated with the topic model 602c. For example, in some embodiments, the evaluation data 604c is compared with a previously stored portion of evaluation data associated with the topic model 602c to determine whether the evaluation data 604c represents a less accurate performance than the previously stored portion of evaluation data (e.g., a lower score value indicating a decrease in performance). Some such embodiments determine whether a loss in accuracy has occurred for the topic model 602c based on the comparison.

In some embodiments, the topic model 602c may be removed from use, quarantined, and/or updated in response to detecting the accuracy loss. In some embodiments, an alert is generated and/or output in circumstances where a loss in accuracy is detected. For example, some embodiments initiate an accuracy alerting process 612 in a circumstance where the loss in accuracy is detected. In some embodiments, the accuracy alerting process 612 includes generation and/or outputting of a visual, audio, or other data to a user of a computing device. Such data may embody the alert and indicate that a loss in accuracy was detected for the topic model. The alert may be outputted automatically, or in some circumstances upon request by a user via a client device. Additionally or alternatively, in some embodiments, the accuracy alerting process 612 includes one or more additional models, processes, and/or the like that determines a root cause of the accuracy shift in performance of the topic model.

Additionally or alternatively, some embodiments process one or more portions of evaluation data to determine whether a topic model indicates a change in text data. As illustrated, the evaluation data 604d corresponding to the topic model 602d is processed via a text change detection algorithm 614. In some embodiments, the text change detection algorithm 614 determines whether the evaluation data 604d indicates that a change in the text distribution processed by the topic model 602d . . . . In some embodiments, the change in text distribution results from a change in the underlying text data itself, a change in the source of the text data, a change resulting from differing users inputting the text data, and/or the like. Additionally or alternatively, for example, in some embodiments the text distribution changes based on a change in a size of input text data, a change in the underlying mechanism that generates the text data, occurrence of a new set of topics not previously present in the text data, and/or the like. In some embodiments the text change detection algorithm 614 detects a change in text data in a circumstance where the evaluation data indicates accurate performance of the evaluation data 604d and tag data for particular text data is different or is determined via an LLM to capture different main points. It should be appreciated that in some embodiments, the text change detection algorithm 614 is configured to detect the change in the text distribution without identifying a root cause of the change.

In some embodiments, an alert is generated and/or output in circumstances where a change in text data is detected. For example, some embodiments initiate a text change alerting process 616 in a circumstance where change in text data is detected. In some embodiments, the text change alerting process 616 includes generation and/or outputting of a visual, audio, or other data to a user of a computing device. Such data may embody the alert and indicate that a change in text data was detected. The alert may be outputted automatically, or in some circumstances upon request by a user via a client device. Additionally or alternatively, in some embodiments, the text change alerting process 616 includes one or more additional models, processes, and/or the like that determines a root cause of the text change with respect to the topic model 604*d*.

It will be appreciated that a portion of evaluation data may be utilized in any number of downstream processes. For example, as illustrated, the evaluation data 604*c* is utilized in both an optimal topic model selection algorithm 606 and accuracy loss detection algorithm 610. Additionally or alternatively, in some embodiments, a portion of evaluation data is utilized only in a particular downstream process. For example, the topic model 602*d* may only be utilized in a text change detection algorithm 614. In some embodiments, evaluation data corresponding to particular topic models are processed utilizing different downstream models particular to each topic model.

Figure 7:
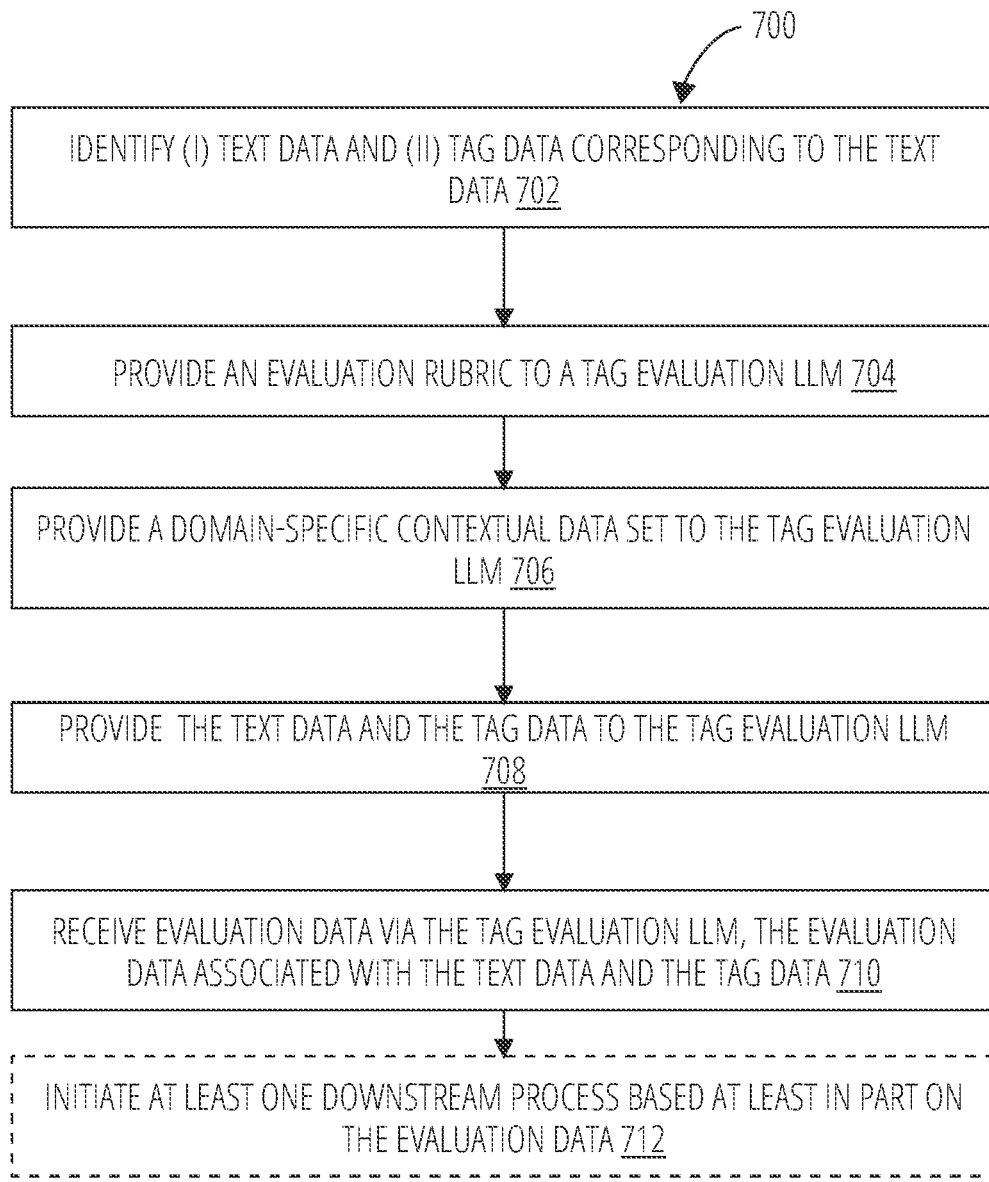
FIG. 7 illustrates a flowchart depicting example operations of an example process in accordance with at least one embodiment of the present disclosure.

FIG. 7 illustrates a flowchart depicting example operations of an example process in accordance with at least one embodiment of the present disclosure. Although the example process 700 depicts a particular sequence of operations, the sequence may be altered without departing from the scope of the present disclosure. For example, some of the operations depicted may be performed in parallel or in a different sequence that does not materially affect the function of the process 700. In other examples, different components of an example device or system that implements the process 700 may perform functions at substantially the same time or in a specific sequence.

The blocks indicate operations of each process. Such operations may be performed in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes in various embodiments include some or all operational steps described and/or depicted, including one or more optional blocks in some embodiments. With regard to the flowcharts illustrated herein, one or more of the depicted block(s) in some embodiments is/are optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 7 specifically depicts a process 700. The process 700 embodies an example computer-implemented method. In some embodiments, the process 700 is embodied by computer program code stored on a non-transitory computer-readable storage medium of a computer program product configured for execution to perform the process as depicted and described. Additionally or alternatively, in some embodiments, the process 700 is performed by one or more specially configured computing devices, such as the specially configured servers and/or apparatuses depicted and/or described herein alone or in communication with one or more other component(s), device(s), system(s), and/or the like. In this regard, in some such embodiments, such at least one computing device is specially configured by computer-coded instructions (e.g., computer program instructions) stored thereon, for example in a memory element and/or another component depicted and/or described herein and/or otherwise accessible to the computing device, for performing the operations as depicted and described. In some embodiments, the computing device is in communication with one or more external apparatus(es), system(s), device(s), and/or the like, to perform one or more of the operations as depicted and described. In some embodiments, the computing device is in communication with separate component(s) of a network, external network(s), and/or the like, to perform one or more of the operation(s) as depicted and described. For purposes of simplifying the description, the process 700 is described as performed by and from the perspective of a specially configured apparatus configured to support a tag evaluation LLM as depicted and described herein.

According to some examples, the method includes identifying (i) text data and (ii) tag data corresponding to the text data at operation 702. The tag data corresponds to the text data and is outputted by a corresponding topic model. In this regard, the tag data represents a characterization of the text data generated by the topic model, for example a topic-modeling LLM, that outputs such tag data. In some embodiments, the text data and/or the tag data is retrieved from a database that stores any number of portions of text data and/or associated tag data upon generation by one or more topic model. Additionally or alternatively, in some embodiments tone or more of the text data and/or the tag data is transmitted from an external computing device that supports the topic model that generates the tag data.

According to some examples, the method includes providing an evaluation rubric to a tag evaluation LLM at operation 704. In some embodiments, the evaluation rubric defines a plurality of evaluation data values that are selectable as evaluation data for a corresponding pair of text data and tag data. In this regard, in some embodiments the plurality of evaluation data values embodies candidate evaluation results that a trained tag evaluation LLM selects from during evaluation of the tag data for particular text data. In some embodiments, the evaluation rubric comprises data that defines a plurality of candidate evaluation results based on one or more metrics. In some such embodiments, the evaluation rubric defines such candidate evaluation results based on (i) a first metric representing whether a main point of the text data is captured by the tag data corresponding to the text data, and (ii) a second metric representing whether the tag data captures the main point of the text data at a target level of detail. In some embodiments, the evaluation rubric corresponds to the evaluation rubric 500 as depicted and described herein. In some embodiments, the evaluation rubric is provided to the tag evaluation LLM via a first prompt defining the evaluation rubric, or in some embodiments is provided in combination with any number of other inputs that configure the tag evaluation LLM as further described herein.

According to some examples, the method includes providing a domain-specific contextual data set to the tag evaluation LLM at operation 706. In some embodiments, the domain-specific contextual data includes contextual data associated with a particular target domain, such as descriptions of procedures that occur within the domain, definitions for particular terminology utilized in text data within the domain, and/or the like. In some embodiments the domain-specific contextual data is retrieved from one or more local databases, and/or one or more external databases associated with external systems trusted as associated with a particular domain. In some embodiments the domain-specific contextual data set includes data aggregated from a plurality of subsets of data associated with the domain from different sources. In some embodiments, the domain-specific contextual data set is provided to the tag evaluation LLM via a second prompt defining the domain-specific contextual data set, or in some embodiments is provided in combination with any number of other inputs that configure the tag evaluation LLM as further described herein.

According to some examples, the method includes providing the text data and the tag data to the tag evaluation LLM at operation 708. In some embodiments, the text data and the tag data form a pair where the tag data is generated characterizing the text data specifically. In some such embodiments, the tag data is generated by a particular topic model, for example by providing the text data to the topic model to generate the corresponding tag data. Additionally or alternatively, in some embodiments, the text data and tag data in some embodiments is retrieved from a database subsequent to generation of tag data upon storage of the pair of text data and tag data for further processing. In some embodiments, the text data and the tag data are provided to the tag evaluation LM via a third prompt, or a third prompt and a fourth prompt, or in some embodiments are provided in combination with any number of other inputs that configure the tag evaluation LLM as further described herein.

According to some examples, the method includes receiving evaluation data via the tag evaluation LLM, the evaluation data associated with the text data and the tag data at operation 710. In some such embodiments, the tag evaluation LLM is triggered to generate the evaluation data based on the various inputs provided to the tag evaluation LLM. In this regard, the tag evaluation LLM may be configured by one or more of the previously provided inputs, for example the domain-specific contextual data set and/or the evaluation rubric and utilize such configurations to evaluate an inputted pair of text data and tag data. The tag evaluation LLM may generate evaluation data representing a determination of how well the tag data characterizes the corresponding text data based on an evaluation rubric and/or metrics defined therein.

According to some examples, the method includes initiating at least one downstream process based on the evaluation data at optional operation 712. In some embodiments, the downstream process includes any one or more of the processes described with respect to FIG. 6, such as an accuracy loss detection process, text change detection process, and/or an optimal topic model selection process. Additionally or alternatively, in some embodiments, the evaluation data is outputted and/or stored for subsequent processing.

VI. CONCLUSION

Embodiments of the present disclosure can be implemented in various ways, including as computer program products that comprise articles of manufacture. Such computer program products can include one or more software components including, for example, software objects, methods, data structures, or the like. A software component can be coded in any of a variety of programming languages. An illustrative programming language can be a lower-level programming language such as an assembly language associated with a particular hardware architecture and/or operating system platform. A software component comprising assembly language instructions can require conversion into executable machine code by an assembler prior to execution by the hardware architecture and/or platform. Another example programming language can be a higher-level programming language that can be portable across multiple architectures. A software component comprising higher-level programming language instructions can require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages can be executed directly by an operating system or other software component without having to be first transformed into another form. A software component can be stored as a file or other data storage construct. Software components of a similar type or functionally related can be stored together such as, for example, in a particular directory, folder, or library. Software components can be static (e.g., pre-established, or fixed) or dynamic (e.g., created or modified at the time of execution).

A computer program product can include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium can include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium can also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium can also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium can also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium can include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media can be substituted for or used in addition to the computer-readable storage media described above.

As should be appreciated, various embodiments of the present disclosure can also be implemented as methods, apparatus, systems, computing devices, computing entities, and/or the like. As such, embodiments of the present disclosure can take the form of an apparatus, system, computing device, computing entity, and/or the like executing instructions stored on a non-transitory computer-readable storage medium to perform certain steps or operations. Thus, embodiments of the present disclosure can also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations can be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a non-transitory computer-readable storage medium for execution. For example, retrieval, loading, and execution of code can be performed sequentially such that one instruction is retrieved, loaded, and executed at a time. In some exemplary embodiments, retrieval, loading, and/or execution can be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, e.g., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations,

VII. EXAMPLES

Example 1. A computer-implemented method comprising: identifying, by one or more processors, (i) text data and (ii) tag data corresponding to the text data, where the tag data comprises data outputted from a topic model; providing, by the one or more processors, an evaluation rubric to a tag evaluation LLM, where the evaluation rubric defines a plurality of candidate evaluation results based on (i) a first metric representing whether a main point of the text data is captured by the tag data corresponding to the text data, and (ii) a second metric representing whether the tag data captures the main point of the text data at a target level of detail; providing, by the one or more processors, a domain-specific contextual data set to the tag evaluation LLM; providing, by the one or more processors, the text data and the tag data to the tag evaluation LLM; and receiving, by the one or more processors, evaluation data via the tag evaluation LLM, the evaluation data associated with the text data and the tag data.

Example 2. The computer-implemented method of any of the preceding examples, where the topic model is a topic-modeling LLM.

Example 3. The computer-implemented method of any of the preceding examples further comprising: initiating, by the one or more processors, at least one downstream process based on the evaluation data.

Example 4. The computer-implemented method of any of the preceding examples, where initiating the at least one downstream process comprises: selecting, by the one or more processors, an optimal topic model from a plurality of topic models based on comparison of the evaluation data corresponding to the topic model with at least one other evaluation data corresponding to at least one other topic model of the plurality of topic models.

Example 5. The computer-implemented method of any of the preceding examples, further comprising: deploying, by the one or more processors, the optimal topic model to process subsequently received text data.

Example 6. The computer-implemented method of any of the preceding examples, where initiating the at least one downstream process comprises: detecting, by the one or more processors and based on the evaluation data, that the topic model is associated with a decrease in accuracy; and outputting an alert indicating that the topic model is associated with the decrease in accuracy.

Example 7. The computer-implemented method of any of the preceding examples, where initiating the at least one downstream process comprises: detecting, by the one or more processors, a change in the text data based on the evaluation data; and outputting an alert indicating the change in the text data.

Example 8. The computer-implemented method of any of the preceding examples, where identifying the tag data comprises: providing, by the one or more processors, the text data to the topic model that generates the tag data.

Example 9. The computer-implemented method of any of the preceding examples, where identifying the tag data comprises: receiving, by the one or more processors, the tag data from a database; or receiving the tag data from an external device.

Example 10. The computer-implemented method of any of the preceding examples, where providing the text data and the tag data to the tag evaluation LLM comprises: generating, by the one or more processors, a first prompt identifying (i) the text data and (ii) the tag data, where the first prompt is provided to the tag evaluation LLM.

Example 11. The computer-implemented method of any of the preceding examples, where the first prompt further identifies the evaluation rubric.

Example 12. The computer-implemented method of any of the preceding examples, where the first prompt further identifies the domain-specific contextual data set.

Example 13. The computer-implemented method of any of the preceding examples, where the evaluation rubric comprises: a first grading level indicating that the tag data misses the main point of the text data, a second grading level indicating that the tag data captures a tangential point or that the main point of the text data is misunderstood, a third grading level indicating that the tag data captures the main point of the text data but has no added detail or has at least one wrong detail, a fourth grading level indicating that the tag data captures the main point of the text data at a detail level that should be more granular or less granular, or a fifth grading level indicating that the tag data captures the main point of the text data at the target level of detail.

Example 14. The computer-implemented method of any of the preceding examples, where providing the evaluation rubric to the tag evaluation LLM comprises: generating, by the one or more processors, a second prompt defining the evaluation rubric, where the second prompt is provided to the tag evaluation LLM.

Example 15. The computer-implemented method of any of the preceding examples, where providing the domain-specific contextual data set to the tag evaluation LLM comprises: identifying, by the one or more processors, a set of meta-categories defining categorizations of texts associated with a particular domain; and providing at least the set of meta-categories to the tag evaluation LLM.

Example 16. The computer-implemented method of any of the preceding examples, where providing the domain-specific contextual data set to the tag evaluation LLM comprises: identifying, by the one or more processors, a set of texts describing procedures performed in a particular domain; and providing, by the one or more processors, at least the set of texts to the tag evaluation LLM.

Example 17. The computer-implemented method of any of the preceding examples, where providing the domain-specific contextual data set to the evaluation LLM comprises: generating, by the one or more processors, a third prompt defining the domain-specific contextual data set, where the third prompt is provided to the tag evaluation LLM.

Example 18. The computer-implemented method of any of the preceding examples, where receiving the evaluation data via the tag evaluation LLM comprises: generating, by the one or more processors, a fourth prompt comprising a request to generate the evaluation data based on one or more prompts previously provided to the tag evaluation LLM, where the fourth prompt is provided to the tag evaluation LLM.

Example 19. A computing apparatus comprising memory and one or more processors communicatively coupled to the memory, the one or more processors configured to perform the computer-implemented method of any one of the preceding examples.

Example 20. One or more non-transitory computer-readable storage media comprising instructions that, when executed by one or more processors, cause the one or more processors to perform the computer-implemented method of any one of the preceding examples.

The invention claimed is:

1. A computer-implemented method comprising:
identifying, by one or more processors, (i) text data and (ii) tag data corresponding to the text data,
wherein the tag data comprises data outputted from a topic model;
providing, by the one or more processors, an evaluation rubric to a tag evaluation large language model (LLM),
wherein the evaluation rubric defines a plurality of candidate evaluation results based on (i) a first metric representing whether a main point of the text data is captured by the tag data corresponding to the text data, and (ii) a second metric representing whether the tag data captures the main point of the text data at a target level of detail;
providing, by the one or more processors, a domain-specific contextual data set to the tag evaluation LLM;
providing, by the one or more processors, the text data and the tag data to the tag evaluation LLM; and
receiving, by the one or more processors, evaluation data via the tag evaluation LLM, the evaluation data associated with the text data and the tag data.

2. The computer-implemented method of claim 1, wherein the topic model is a topic-modeling LLM.

3. The computer-implemented method of claim 1, further comprising:
initiating, by the one or more processors, at least one downstream process based on the evaluation data.

4. The computer-implemented method of claim 3, wherein initiating the at least one downstream process comprises:
selecting, by the one or more processors, an optimal topic model from a plurality of topic models based on a comparison of the evaluation data corresponding to the topic model with at least one other evaluation data corresponding to at least one other topic model of the plurality of topic models, wherein the plurality of topic models comprises the topic model.

5. The computer-implemented method of claim 4, further comprising:
deploying, by the one or more processors, the optimal topic model to process subsequently-received text data.

6. The computer-implemented method of claim 3, wherein initiating the at least one downstream process comprises:
detecting, by the one or more processors and based on the evaluation data, that the topic model is associated with a decrease in accuracy; and
outputting, by the one or more processors, an alert indicating that the topic model is associated with the decrease in accuracy.

7. The computer-implemented method of claim 3, wherein initiating the at least one downstream process comprises:
detecting, by the one or more processors, a change in the text data based on the evaluation data; and
outputting, by the one or more processors, an alert indicating the change in the text data.

8. The computer-implemented method of claim 1, wherein identifying the tag data comprises:
providing, by the one or more processors, the text data to the topic model that generates the tag data.

9. The computer-implemented method of claim 1, wherein identifying the tag data comprises:
receiving, by the one or more processors, the tag data from a database; or
receiving, by the one or more processors, the tag data from an external device.

10. The computer-implemented method of claim 1, wherein providing the text data and the tag data to the tag evaluation LLM comprises:
generating, by the one or more processors, a first prompt identifying (i) the text data and (ii) the tag data, wherein the first prompt is provided to the tag evaluation LLM.

11. The computer-implemented method of claim 1, wherein the evaluation rubric comprises:
a first grading level indicating that the tag data misses the main point of the text data,
a second grading level indicating that the tag data captures a tangential point or that the main point of the text data is misunderstood,
a third grading level indicating that the tag data captures the main point of the text data but has no added detail or has at least one wrong detail,
a fourth grading level indicating that the tag data captures the main point of the text data at a detail level that should be more granular or less granular, or
a fifth grading level indicating that the tag data captures the main point of the text data at the target level of detail.

12. The computer-implemented method of claim 1, wherein providing the evaluation rubric to the tag evaluation LLM comprises:
generating, by the one or more processors, a second prompt defining the evaluation rubric, wherein the second prompt is provided to the tag evaluation LLM.

13. The computer-implemented method of claim 1, wherein providing the domain-specific contextual data set to the tag evaluation LLM comprises:
identifying, by the one or more processors, a plurality of meta-categories defining categorizations of texts associated with a particular domain; and
providing, by the one or more processors, at least the plurality of meta-categories to the tag evaluation LLM.

14. The computer-implemented method of claim 1, wherein providing the domain-specific contextual data set to the tag evaluation LLM comprises:
identifying, by the one or more processors, a plurality of texts describing procedures performed in a particular domain; and
providing, by the one or more processors, at least the plurality of texts to the tag evaluation LLM.

15. The computer-implemented method of claim 1, wherein providing the domain-specific contextual data set to the evaluation LLM comprises:
generating, by the one or more processors, a third prompt defining the domain-specific contextual data set, wherein the third prompt is provided to the tag evaluation LLM.

16. The computer-implemented method of claim 1, wherein receiving the evaluation data via the tag evaluation LLM comprises:
generating, by the one or more processors, a fourth prompt comprising a request to generate the evaluation data based on one or more prompts previously provided to the tag evaluation LLM, wherein the fourth prompt is provided to the tag evaluation LLM.

17. A system comprising at least one memory and one or more processors communicatively coupled to the at least one memory, the one or more processors configured to:
identify (i) text data and (ii) tag data corresponding to the text data,
wherein the tag data comprises data outputted from a topic model;
provide an evaluation rubric to a tag evaluation large language model (LLM),
wherein the evaluation rubric defines a plurality of candidate evaluation results based on (i) a first metric representing whether a main point of the text data is captured by the tag data corresponding to the text data, and (ii) a second metric representing whether the tag data captures the main point of the text data at a target level of detail;
provide a domain-specific contextual data set to the tag evaluation LLM;
provide the text data and the tag data to the tag evaluation LLM; and
receive evaluation data via the tag evaluation LLM, the evaluation data associated with the text data and the tag data.

18. The system of claim 17, wherein the one or more processors are further configured to:
initiate at least one downstream process based on the evaluation data.

19. The system of claim 17, wherein the evaluation rubric comprises:
a first grading level indicating that the tag data misses the main point of the text data,
a second grading level indicating that the tag data captures a tangential point or that the main point of the text data is misunderstood,
a third grading level indicating that the tag data captures the main point of the text data but has no added detail or has at least one wrong detail,
a fourth grading level indicating that the tag data captures the main point of the text data at a detail level that should be more granular or less granular, or a fifth grading level indicating that the tag data captures the main point of the text data at the target level of detail.

20. At least one non-transitory computer-readable storage medium, the at least one non-transitory computer-readable storage medium comprising instructions that when executed by at least one computer, cause the at least one computer to:
  identify (i) text data and (ii) tag data corresponding to the text data,
    wherein the tag data comprises data outputted from a topic model;
  provide an evaluation rubric to a tag evaluation large language model (LLM),
    wherein the evaluation rubric defines a plurality of candidate evaluation results based on (i) a first metric representing whether a main point of the text data is captured by the tag data corresponding to the text data, and (ii) a second metric representing whether the tag data captures the main point of the text data at a target level of detail;
  provide a domain-specific contextual data set to the tag evaluation LLM;
  provide the text data and the tag data to the tag evaluation LLM; and
  receive evaluation data via the tag evaluation LLM, the evaluation data associated with the text data and the tag data.

* * * * *